Feb. 23, 1932.    W. A. CLENCH    1,846,543
DEMOUNTABLE VEHICLE WHEEL
Filed May 14, 1930
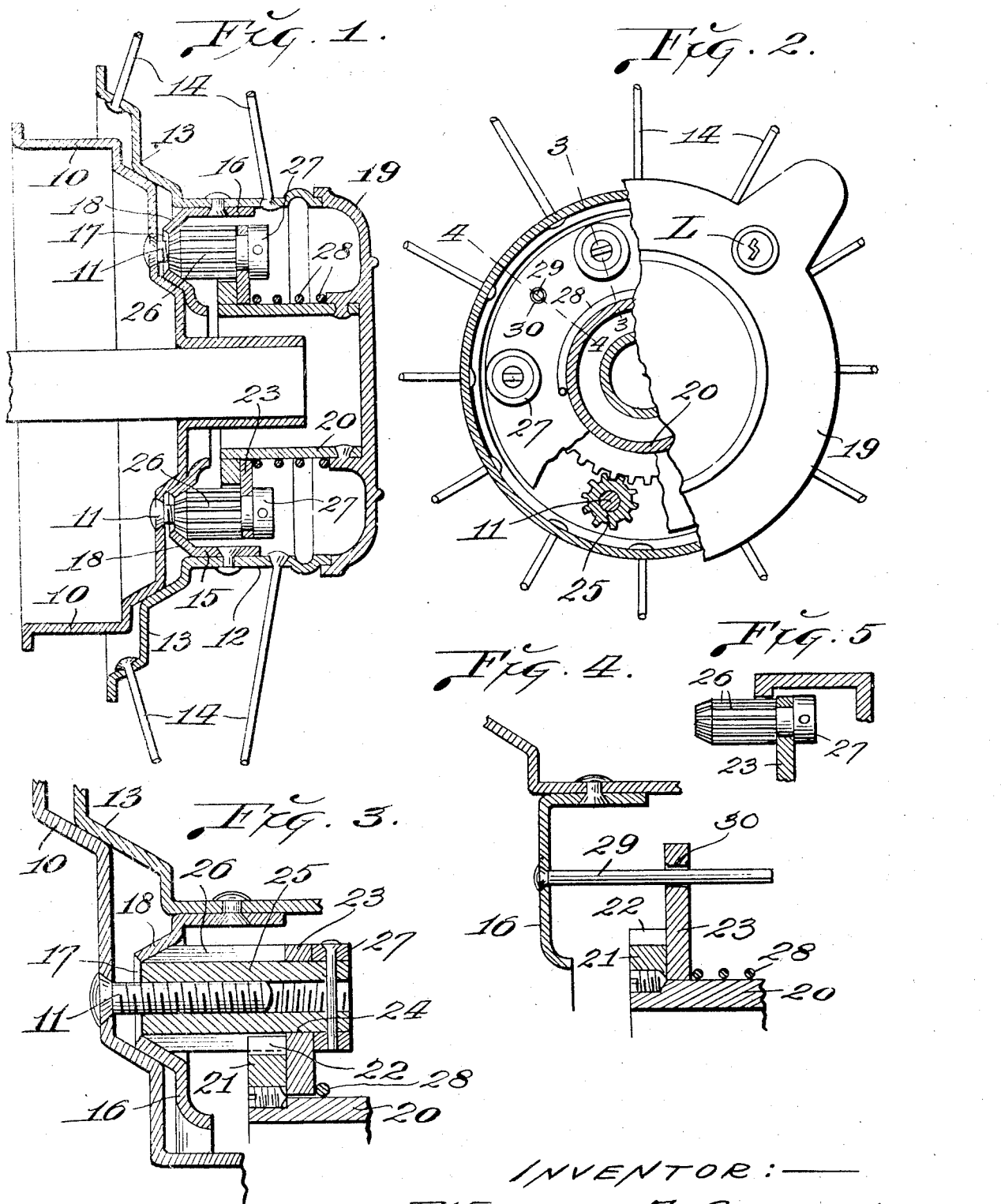
INVENTOR:—
WILLIAM A. CLENCH.
BY Morton P. Smith ATTY.

Patented Feb. 23, 1932

1,846,543

UNITED STATES PATENT OFFICE

WILLIAM A. CLENCH, OF LOS ANGELES, CALIFORNIA

DEMOUNTABLE VEHICLE WHEEL

Application filed May 14, 1930. Serial No. 452,241.

My invention relates generally to vehicle wheels and more particularly to a demountable wheel for motor vehicles and the principal objects of my invention are to generally improve upon and simplify the construction of the existing forms of demountable wheels and to provide relatively simple, practical and efficient means for securely fastening the hub portion of a wheel to the hub drum that is carried by the end of the axle.

Further objects of my invention are to provide a demountable wheel attaching device that is capable of being easily and quickly manipulated when applied to or removed from the hub drum, further, to provide a demountable wheel fastening device that includes a plurality of nuts that are simultaneously screwed unto or from studs that are rigidly seated in the hub drum and further, to provide a demountable wheel attaching device that is relatively simple in construction, inexpensive of manufacture and which presents a neat and finished appearance.

With the foregoing and other objects in view, my invention consists in certain novel features of construction and arrangement of parts that will hereinafter be more fully described and claimed and illustrated in the accompanying drawings, in which:

Fig. 1 is a vertical section taken through the center of the hub portion of a demountable wheel constructed in accordance with my invention.

Fig. 2 is an elevational view of the wheel hub securing means with parts broken away and in section.

Fig. 3 is an enlarged detail view taken on the line 3—3 of Fig. 2.

Fig. 4 is an enlarged detail view taken on the line 4—4 of Fig. 2.

Fig. 5 is a detail view of a modified construction for imparting motion to the combined nuts and pinions forming a part of my invention.

Referring by numerals to the accompanying drawings which illustrate a practical embodiment of my invention, 10 designates a hub drum and rigidly fixed thereto are the inner ends of a plurality of outwardly projecting threaded studs 11.

The hub of the demountable wheel contemplated by my invention, comprises a short tubular member 12 provided on its inner end with a flange 13 that is adapted to engage the hub drum 10 and where the wheel is of the type having wire spokes such as 14, the inner ends of said spokes are rigidly secured in any suitable manner to the shell 12 and flange 13.

Rigidly fixed in any suitable manner within the shell 12 is a ring 15 provided at its inner end with an inwardly projecting ring flange 16 and formed through said flange is a plurality of apertures 17 that correspond in number and location with the studs 11. Portions of the flange 16, immediately adjacent to these openings, are bent outwardly to form counter-sunk seats 18 for the tapered ends of the nuts that engage the threaded studs 11.

The disc shaped hub cap 19, that is adapted to fit over the end of the tubular member 12, is provided on its inner face with a concentrically arranged tubular member 20 and secured in any suitable manner to the inner end of this tubular member is a ring 21 that is provided with a circumferential row of gear teeth 22.

Arranged for sliding movement on the tubular member 20 is a ring 23 and formed therethrough is a series of apertures 24 that function as bearings for combined pinions and nuts 25.

The openings through these nuts 25 are threaded for the reception of the threaded studs 11 and formed on the outer faces of the nuts are gear teeth 26 that are engaged by the teeth 22 of the ring 21.

The forward ends of the combined nuts and pinions are tapered so as to readily enter the counter-sunk seats 18 in flange 16.

The rear portions of the bodies of the combined nuts and pinions pass through the bearings 24 in ring 23 and secured on the projecting rear ends of said nuts and pinions are collars 27.

Arranged on the tubular member 20 and interposed between the ring 23 and the hub cap 19 is an expansive coil spring 28.

Rigidly fixed in the flange 16 at points between the countersunk seats 18 are pins or short rods 29 that lie parallel with the axis of the hub and formed through ring 23 are apertures 30 for the accommodation of these rods or pins, thereby holding the ring 23 and parts carried thereby against rotation when hub cap 19 and parts carried thereby are rotated.

When the wheel hub is secured to the hub drum by my improved attaching means, the parts thereof occupy the positions as illustrated in Figs. 1, 2 and 3 and hub cap 19 may be provided with a suitable lock such as L for locking said cap to the tubular member 12.

To release the attaching means so that the wheel may be removed, hub cap 19 is unlocked and then rotated toward the right hand and the teeth 22 on ring 21 will engage and rotate the combined nuts and pinions 25, thereby rotating the latter toward the left hand unscrewing same from the threaded studs 11.

Thus all of the combined nuts and pinions are unscrewed from the studs simultaneously and when so unscrewed the wheel hub may be readily removed from the hub drum 10.

To secure the wheel hub to the hub drum, the hub comprising the parts 12 and 13 is applied to the hub drum with the ends of the threaded studs 11 engaged by the forward ends of the combined nuts and pinions 25 and the hub cap 19 is now rotated toward the left hand, thereby simultaneously rotating all of the combined nuts and pinions 25 toward the right hand and as a result said combined nuts and pinions will be screwed unto the threaded studs 11 until the tapered forward ends of said combined nuts and pinions enter the countersunk recesses 18 and when the combined nuts and pinions are tightened the wheel hub will be very firmly secured to the hub drum.

Spring 28 will yieldingly resist outward movement of ring 23 that carries the combined nuts and pinions and thereby enable the latter to engage the threaded studs when the wheel hub is to be applied to the hub drum and by permitting the ring 23 to yield slightly all of the combined nuts and pinions will pick up the threads on the studs 11 at some time during the first complete rotation of said nuts and pinions.

The pins 29 that pass through the apertures 30 hold the ring 23 that carries the combined nuts and pinions against rotation upon the tubular member 20 and at the same time permits ring 23 to move longitudinally upon member 20 at the time the ends of the combined nuts and pinions are engaging the ends of the threaded studs.

In order to cause the combined nuts and pinions to screw unto the threaded studs when the hub cap is rotated toward the right hand the studs 11 and nuts 25 should be provided with left-hand threads or, as illustrated in Fig. 5, a flange on tubular member 20 may surround the combined nuts and pinions and said flange having an internally arranged series of teeth that engage the outer portions of said combined nuts and pinions.

The tubular member 20 that is secured to the central portion of the hub cap 19 reenforces the same and therefore resists externally applied blows that would otherwise tend to dent the hub cap.

When the hub cap and parts carried thereby are rotated so as to screw the combined nuts and pinions unto the threaded studs, the wheel hub will be very effectively secured to the hub drum and by locking the hub cap to the wheel hub, the latter cannot be removed from the hub drum until the lock is released.

Thus it will be seen that I have provided a readily demountable wheel that is relatively simple in construction, inexpensive of manufacture, capable of being readily manipulated and very effective in performing the functions for which it is intended.

It will be understood that minor changes in the size, form and construction of the various parts of my improved demountable vehicle wheel may be made and substituted for those herein shown and described without departing from the spirit of my invention, the scope of which is set forth in the appended claims.

I claim as my invention:

1. The combination with a hub drum and threaded studs projecting therefrom, of a wheel hub, nuts carried by said wheel hub for engaging said threaded studs, means for yieldingly pressing said nuts toward said studs, and means on the wheel hub for a simultaneously rotating all of said nuts.

2. The combination with a hub drum provided with a plurality of outwardly projecting threaded studs, of a wheel hub, a member loosely arranged within said wheel hub, a plurality of nuts rotatably arranged in said loosely mounted member, means for yieldingly pressing said nuts toward said studs and means for simultaneously rotating all of said nuts.

3. The combination with a hub drum provided with a plurality of outwardly projecting threaded studs, of a wheel hub, a member loosely arranged within said wheel hub, a plurality of nuts rotatably arranged in said loosely mounted member, means for yieldingly pressing said nuts toward said studs, means for simultaneously rotating all of said nuts and means for holding said loosely arranged member against rotation while the nuts are being rotated.

4. The combination with a hub drum and threaded studs projecting therefrom, of a wheel hub, nuts carried by said wheel hub for engaging said threaded studs, means for yieldingly pressing said nuts toward said studs, means within the wheel hub for simultaneously rotating all of said nuts, the forward ends of said nuts being tapered and countersunk bearings for the tapered forward ends of said nuts.

5. The combination with a hub drum and threaded studs projecting therefrom, of a wheel hub, a member loosely arranged within said wheel hub, nuts rotatably arranged on said loosely mounted member, means for yieldingly pressing said nuts toward said studs, means for simultaneously rotating the nuts for screwing the same into said studs, the forward ends of said nuts being tapered and countersunk bearings for the tapered forward ends of said nuts.

6. In a demountable wheel, a hub drum, threaded studs projecting therefrom, a wheel hub, a member loosely arranged within the wheel hub, nuts rotatably arranged on said loosely mounted member, means for yieldingly pressing said nuts toward said studs, which nuts are adapted to engage said threaded studs, a hub cap loosely mounted on the outer end of the wheel hub and means carried by said hub cap for simultaneously rotating said nuts.

7. In a demountable wheel, a hub drum, threaded studs projecting therefrom, a wheel hub, a member loosely arranged within the wheel hub, nuts rotatably arranged on said loosely mounted member, which nuts are adapted to engage said threaded studs, a hub cap loosely mounted on the outer end of the wheel hub, means carried by said hub cap for simultaneously rotating said nuts and a spring arranged within the hub cap and bearing against said loosely mounted member.

8. In a demountable wheel, a hub drum, threaded studs projecting therefrom, a wheel hub, a member loosely arranged within the wheel hub, nuts rotatably arranged on said loosely mounted member, which nuts are adapted to engage said threaded studs, a hub cap loosely mounted on the outer end of the wheel hub, means carried by said hub cap for simultaneously rotating said nuts, a spring arranged within the hub cap and bearing against said loosely mounted member and means for holding said loosely mounted member against rotary motion while the nuts are being screwed on or off the threaded studs.

9. In a demountable wheel, a hub drum, threaded studs projecting from said drum, a wheel hub, nuts arranged for operation within said wheel hub and adapted to engage said threaded studs, means for yieldingly pressing said nuts toward said studs, said nuts being provided with gear teeth and a rotatably mounted toothed member engaging the teeth of said nuts.

10. In a demountable wheel, a hub drum, threaded studs projecting from said drum, a wheel hub, nuts arranged for operation within said wheel hub and adapted to engage said threaded studs, means for yieldingly pressing said nuts toward said studs, said nuts being provided with gear teeth, a rotatably mounted toothed member engaging the teeth of said nuts and manually operable means for actuating said rotatably mounted member and simultaneously rotating said nuts.

In testimony whereof I affix my signature.

WILLIAM A. CLENCH.